(12) United States Patent
Hirokawa (10) Patent No.: US 11,821,493 B2
(45) Date of Patent: Nov. 21, 2023

(54) OUTPUT DEVICE

(71) Applicant: NIDEC CORPORATION, Kyoto (JP)

(72) Inventor: Tsuyoshi Hirokawa, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 17/752,756

(22) Filed: May 24, 2022

(65) Prior Publication Data

US 2022/0381321 A1 Dec. 1, 2022

(30) Foreign Application Priority Data

May 25, 2021 (JP) .................................. 2021-087994

(51) Int. Cl.
*F16H 1/46* (2006.01)
*H02K 7/116* (2006.01)

(52) U.S. Cl.
CPC ............... *F16H 1/46* (2013.01); *H02K 7/116* (2013.01)

(58) Field of Classification Search
CPC . F16H 1/46; F16H 1/2845; F16H 1/48; F16H 3/62
See application file for complete search history.

(56) References Cited

U.S. PATENT DOCUMENTS

| 6,461,265 | B1 * | 10/2002 | Graham | .................. F16H 3/724 475/5 |
| 9,033,837 | B2 * | 5/2015 | Smetana | ................... F16H 1/36 475/5 |
| 10,443,688 | B2 | 10/2019 | Lau et al. | |

FOREIGN PATENT DOCUMENTS

| CN | 102998930 A | * | 3/2013 | ............... F16H 1/46 |
| JP | 2726699 B2 | * | 3/1998 | ........... F16H 57/082 |

* cited by examiner

*Primary Examiner* — Derek D Knight
(74) *Attorney, Agent, or Firm* — HAUPTMAN HAM, LLP (57) ABSTRACT

A motor section including a motor shaft extending along a central axis extending vertically, and a speed reduction mechanism disposed on an upper part of the motor section and connected to the motor shaft are included. The speed reduction mechanism includes a plurality of planetary gear mechanisms arranged side by side vertically along the central axis. In the planetary gear mechanisms vertically adjacent to each other, the shaft having the sun gear of the upper planetary gear mechanism includes a recess recessed axially on the lower end surface. The upper end of the shaft having the sun gear of the lower planetary gear mechanism is disposed in the recess via a bearing.

10 Claims, 6 Drawing Sheets

OUTPUT DEVICE

CROSS-REFERENCE TO RELATED APPLICATIONS

The present invention claims priority under 35 U.S.C. § 119 to Japanese Patent Application No. 2021-087994 filed on May 25, 2021, the entire content of which is incorporated herein by reference.

FIELD OF THE INVENTION

The present disclosure relates to an output device.

BACKGROUND

Conventionally, a drive device using an electric motor has been known. This type of drive device includes a motor and a gearbox. This gearbox is a two-stage gearbox including a first planetary gear train having a first planetary gear and a second planetary gear train having a second planetary gear. The sun gear of the first planetary gear train and the sun gear of the second planetary gear train are coaxially arranged.

In the conventional drive device, the second-stage sun gear is formed apart from the first-stage sun gear. Therefore, the transmitted torque may cause the center of the second-stage sun gear to misalign from the central axis. This may cause vibration of the output rotation and unevenness of the output torque.

SUMMARY

An exemplary output device of the present disclosure includes a motor section including a motor shaft extending along a central axis extending vertically, and a speed reduction mechanism disposed on an upper part of the motor section and connected to the motor shaft. The speed reduction mechanism includes a plurality of planetary gear mechanisms arranged side by side vertically along the central axis. In the planetary gear mechanisms vertically adjacent to each other, the shaft having the sun gear of the upper planetary gear mechanism includes a recess recessed axially on the lower end surface. The upper end of the shaft having the sun gear of the lower planetary gear mechanism is disposed in the recess via a bearing.

The above and other elements, features, steps, characteristics and advantages of the present disclosure will become more apparent from the following detailed description of the preferred embodiments with reference to the attached drawings.

DETAILED DESCRIPTION

An exemplary embodiment of the present disclosure will be described below in detail with reference to the drawings. In the present description, an output device 10 will be described with reference to the state of the output device 10 illustrated in FIG. 2. In the output device 10, a central axis J1 extends vertically. The direction in which the central axis J1 extends is referred to as "axial". A direction orthogonal to the central axis J1 is referred to as "radial", and a direction along an arc about the central axis J1 is referred to as "circumferential". Note that the above-described directions are defined for ease of description, and there is a case of not matching the direction of the output device 10 to be actually used.

Figure 1:
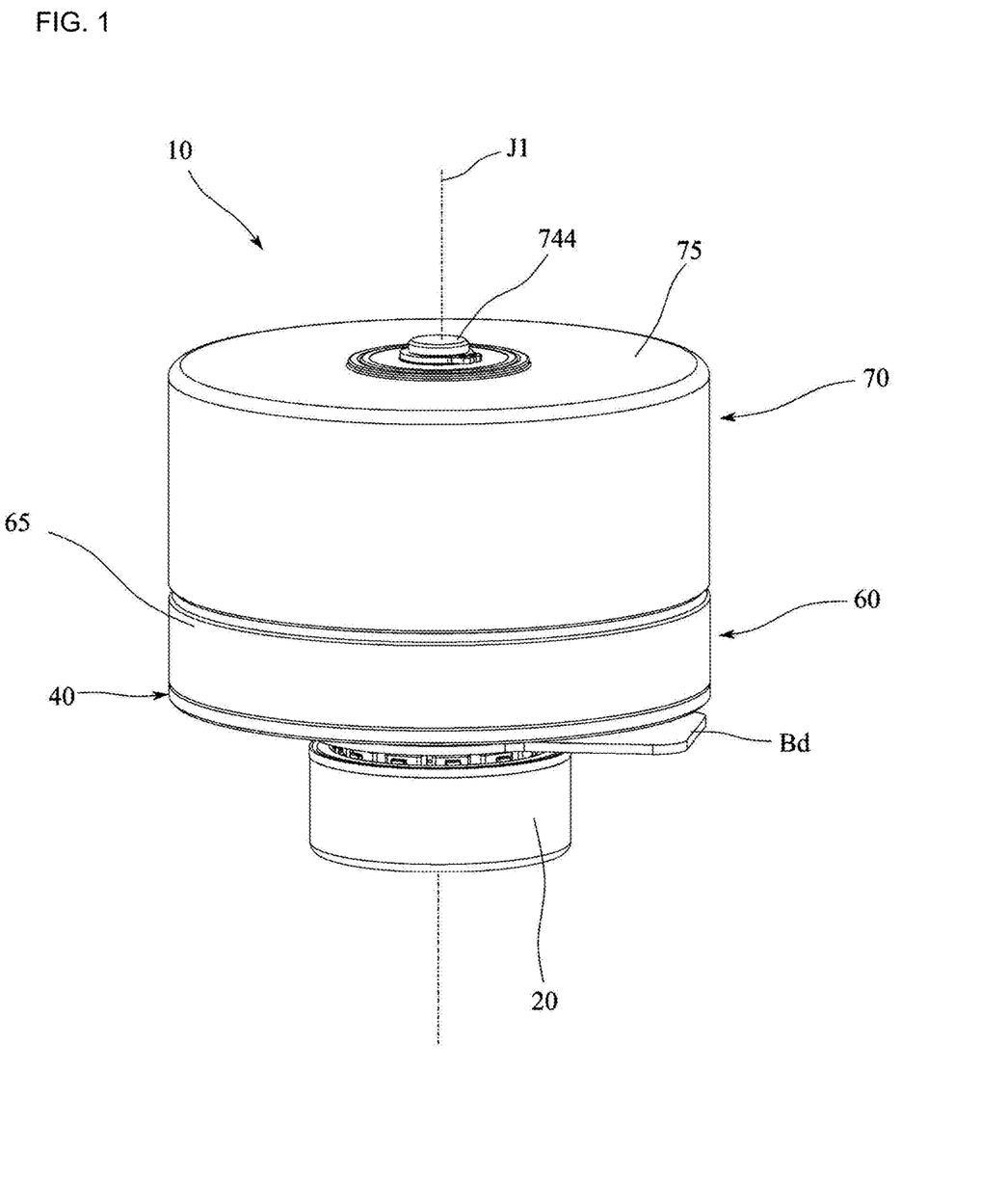
FIG. 1 is a perspective view of an output device.
Figure 2:
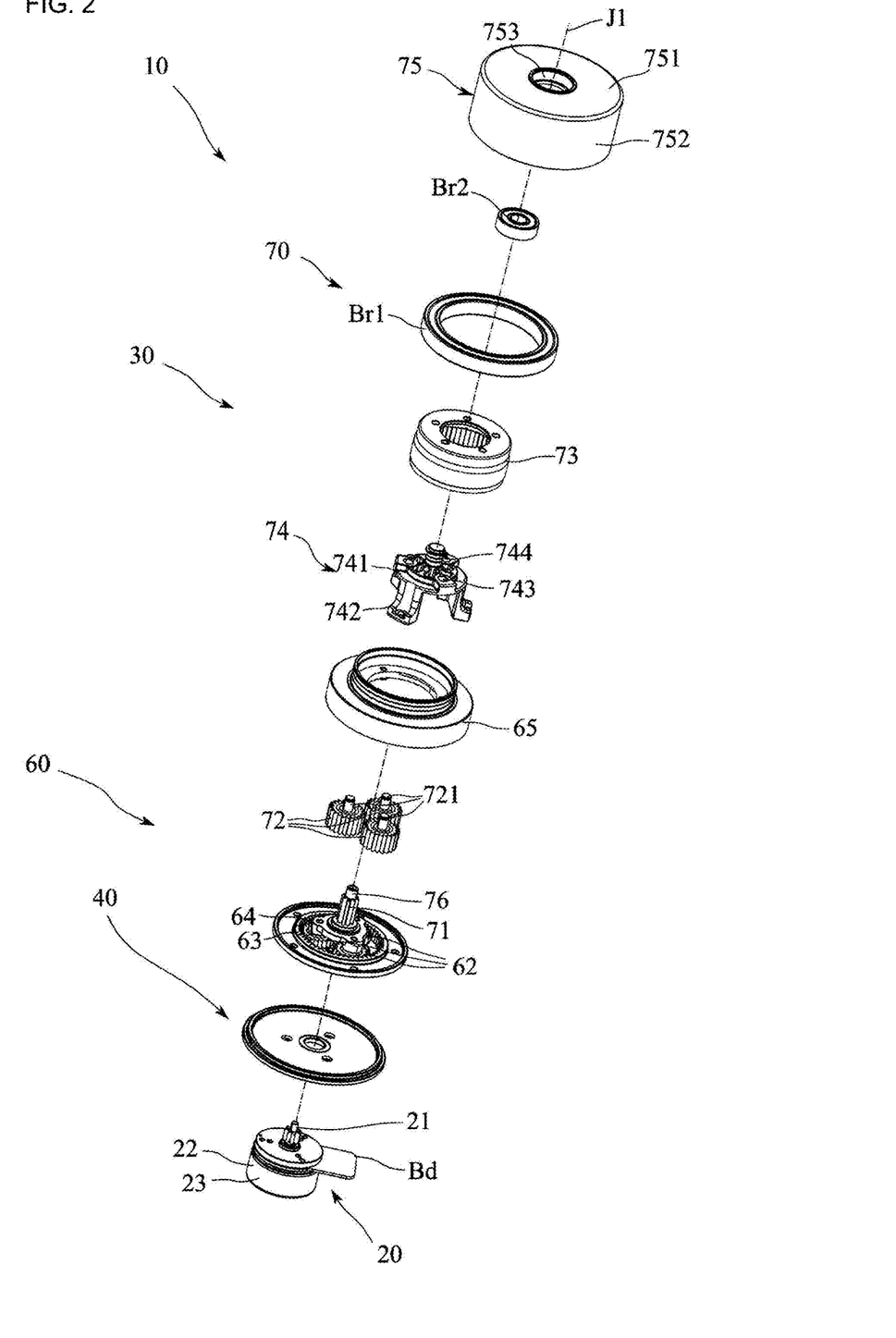
FIG. 2 is an exploded perspective view of the output device illustrated in FIG. 1.
Figure 3:
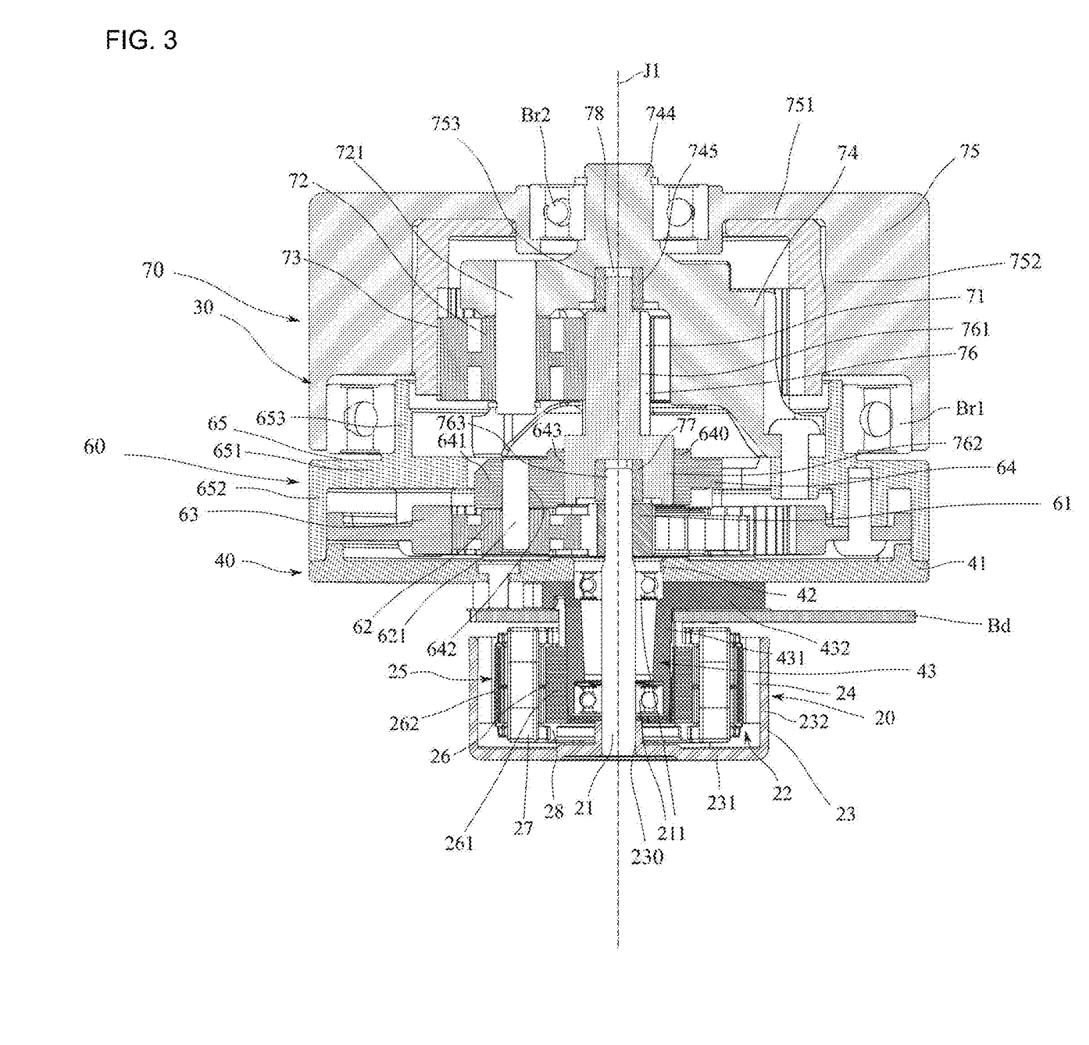
FIG. 3 is a cross-sectional view of the output device illustrated in FIG. 1.

FIG. 1 is a perspective view of the output device 10 according to the present disclosure. FIG. 2 is an exploded perspective view of the output device 10 illustrated in FIG. 1. FIG. 3 is a cross-sectional view of the output device 10 illustrated in FIG. 1. As illustrated in FIGS. 1 to 3, the output device 10 includes a motor section 20 and a speed reduction mechanism 30.

The motor section 20 is a direct-current brushless motor. The motor section 20 includes a motor shaft 21, a rotor 22, and a stator 25. A part of the motor shaft 21, the rotor 22, and the stator 25 are disposed below a base part 40. More specifically, the motor section 20 is fixed to a bearing holding part 43 described later of the base part 40. The motor section 20 is an outer rotor type motor in which the rotor 22 is disposed radially outward of the stator 25. The motor section 20 is not limited to the outer rotor type motor, and may be an inner rotor type motor.

The motor shaft 21 is substantially columnar. As illustrated in FIGS. 1 to 3, the motor shaft 21 extends along the central axis J1 extending vertically. That is, the motor section 20 includes the motor shaft 21 extending along the vertically extending central axis J1. The motor shaft 21 is rotatable about the central axis J1. As illustrated in FIG. 3, the upper end of the motor shaft 21 protrudes above the base part 40.

The motor shaft 21 is rotatably supported on the radial inner surface of the bearing holding part 43 described later of the base part 40 via a shaft bearing 211. The shaft bearing 211 is disposed at two places apart in the axial direction, and rotatably supports two places apart in the axial direction of the motor shaft 21. Here, the shaft bearing 211 is a ball bearing, but is not limited to that. It is possible to widely adopt a bearing structure capable of smoothly and accurately supporting the motor shaft 21.

The rotor 22 is fixed to an outer circumference of the motor shaft 21. The rotor 22 includes a rotor yoke 23 and a rotor magnet 24. The rotor 22 rotates about the vertically extending central axis J1.

The rotor yoke 23 is formed of a magnetic material such as a steel plate. The rotor yoke 23 includes a rotor lid 231 and a rotor tube 232. The rotor lid 231 is annular and expands in a direction orthogonal to the central axis J1. The center of the rotor lid 231 is provided with a through hole 230 penetrating along the central axis J1. The motor shaft 21 is fixed to the through hole 230. That is, the rotor yoke 23 rotates integrally with the motor shaft 21.

The rotor tube 232 is a tube body extending upward from the radial outer edge of the rotor lid 231. The rotor magnet 24 is fixed to the inner surface of the rotor tube 232. The rotor magnet 24 is tubular. On the radial inner surface of the rotor magnet 24, different magnetic poles are alternately arranged in the circumferential direction. Although a tubular configuration is adopted as the rotor magnet 24, the present invention is not limited to this. For example, flat or curved magnets may be fixed side by side in the circumferential direction on the radial inner surface of the rotor tube 232.

The stator 25 includes a stator core 26, a coil 27, and an insulator 28. The stator 25 is held on the radial outer surface of the bearing holding part 43 of the base part 40. The stator core 26 includes a core back 261 and a plurality of teeth 262. The core back 261 is annular. The radial inside surface of the core back 261 is fixed to a holding part tube 431 of the base part 40. The teeth 262 protrude in a direction away from the central axis J1 from the radial outside surface of the core back 261. The plurality of teeth 262 are arranged at regular intervals in the circumferential direction. That is, the coil 27 is formed by winding a conductor wire around the teeth 262.

As illustrated in FIGS. 2 and 3, the base part 40 includes a base plate 41 and the bearing holding part 43. The base plate 41 has an annular shape extending in a direction orthogonal to the central axis J1. The center of the base plate 41 is provided with a base through hole 42 penetrating in the axial direction. The motor shaft 21 penetrates the base through hole 42.

The bearing holding part 43 includes the holding part tube 431 and a holding part flange 432. The holding part tube 431 is cylindrical shape extending along the central axis J1. The holding part flange 432 is annular. The holding part flange 432 expands radially outward from the axially upper end of the holding part tube 431. The holding part flange 432 is fixed to the lower surface of the base plate 41. At this time, the center line of the base plate 41 and the center line of the holding part flange 432 overlap with the central axis J1.

Note that the holding part flange 432 of the bearing holding part 43 and the base plate 41 are fixed by, for example, a fastener such as a screw. The fastener is not limited to a screw, and a configuration capable of firmly fixing the holding part flange 432 and the base plate 41 can be widely adopted. It is preferable to use a fixture capable of detachably fixing the holding part flange 432 to the base plate 41.

On the radial inner surface of the holding part tube 431, shaft bearings 211 are arranged at intervals in the axial direction. That is, the shaft bearing 211 is attached to the holding part tube 431. The shaft bearing 211 rotatably supports the motor shaft 21. The stator core 26 of the stator 25 is fixed to the radial outer surface of the holding part tube 431.

As illustrated in FIG. 3 and the like, the lower surface of the holding part flange 432 is provided with a circuit board Bd. The circuit board Bd is mounted with a control circuit that controls current supplied to the coil 27.

The motor section 20 is driven by power supplied from a power supply not illustrated. That is, the current supplied from the power supply is supplied to the coil 27, whereby the coil 27 is excited. When the coil 27 is excited, a magnetic force is generated between the rotor magnet 24 of the rotor 22 and the coil. By exciting a plurality of the coils 27 at an appropriate timing, torque in the circumferential direction about the central axis J1 is generated in the rotor 22. With this torque, the motor shaft 21 rotates about the central axis J1.

As illustrated in FIGS. 2 and 3, the speed reduction mechanism 30 is disposed along the central axis J1. More specifically, the speed reduction mechanism 30 is disposed above the motor section 20 and is connected to the motor shaft 21. Here, the motor shaft 21 and the speed reduction mechanism 30 are "connected" means that the motor shaft 21 and the speed reduction mechanism 30 are mechanically "connected" or "coupled", and does not mean that the motor shaft 21 and the speed reduction mechanism 30 are electrically connected. Hereinafter, the same is true when "connected" is described.

The speed reduction mechanism 30 includes a plurality of planetary gear mechanisms 60 and 70 arranged side by side vertically along the central axis J1. More specifically, the speed reduction mechanism 30 includes planetary gear mechanisms 60 and 70 arranged in two upper and lower two stages. In the speed reduction mechanism 30 of the present embodiment, the planetary gear mechanism 60 and the planetary gear mechanism 70 are distinguished as the lower planetary gear mechanism 60 and the upper planetary gear mechanism 70. The upper planetary gear mechanism 70 is the uppermost planetary gear mechanism.

Figure 4:
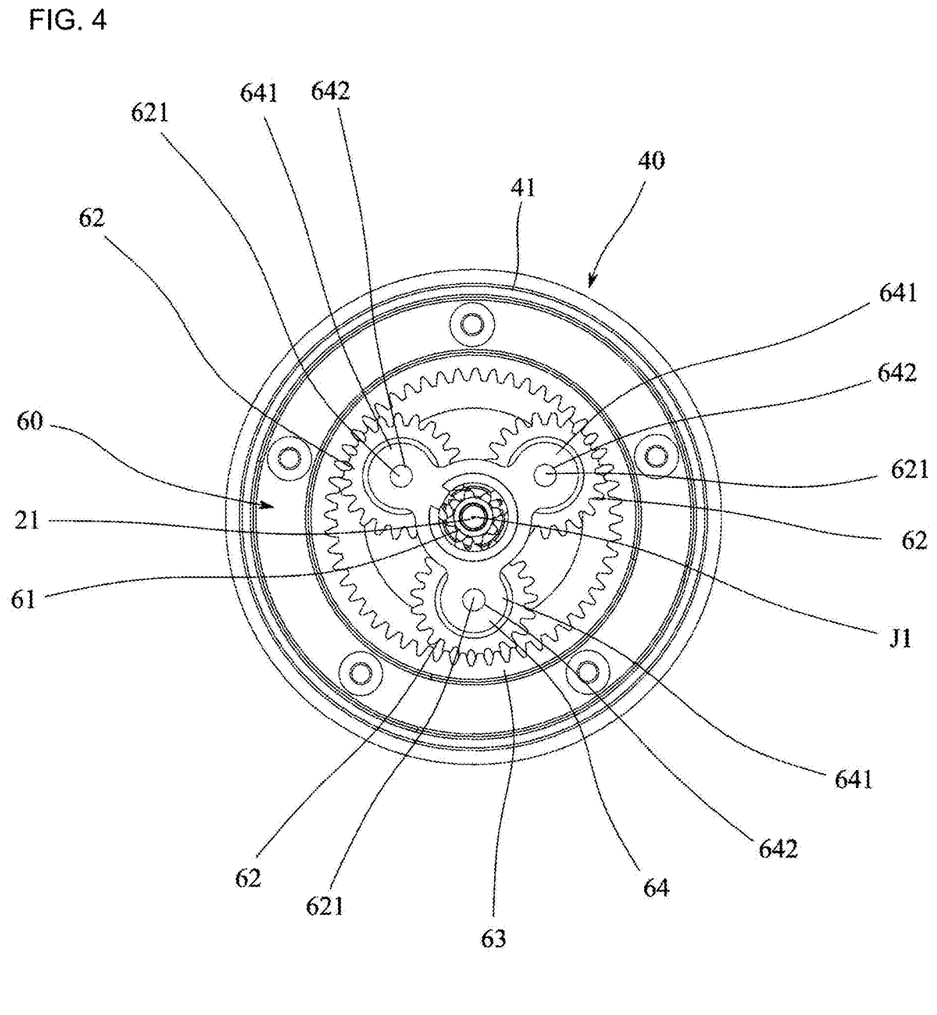
FIG. 4 is a cross-sectional view of the lower planetary gear mechanism taken along a plane orthogonal to the central axis.
Figure 5:
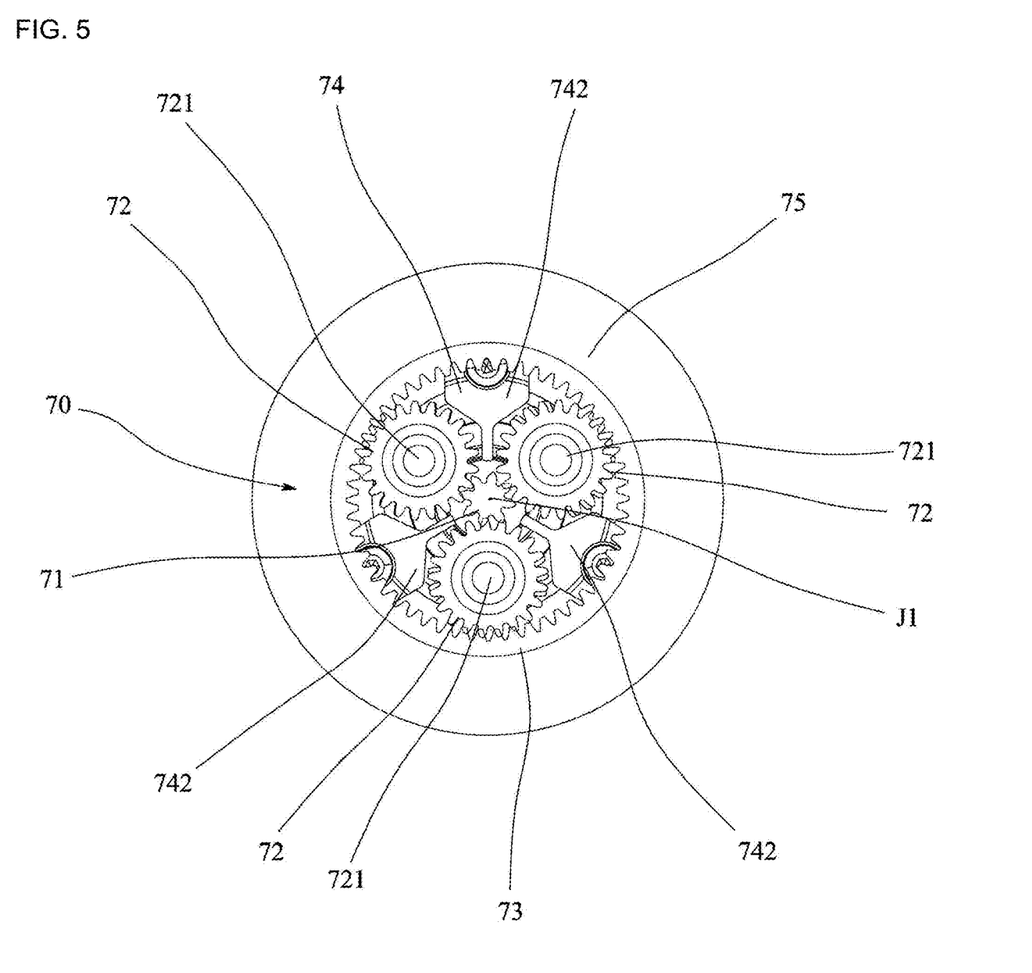
FIG. 5 is a cross-sectional view of the upper planetary gear mechanism taken along a plane orthogonal to the central axis.
Figure 6:
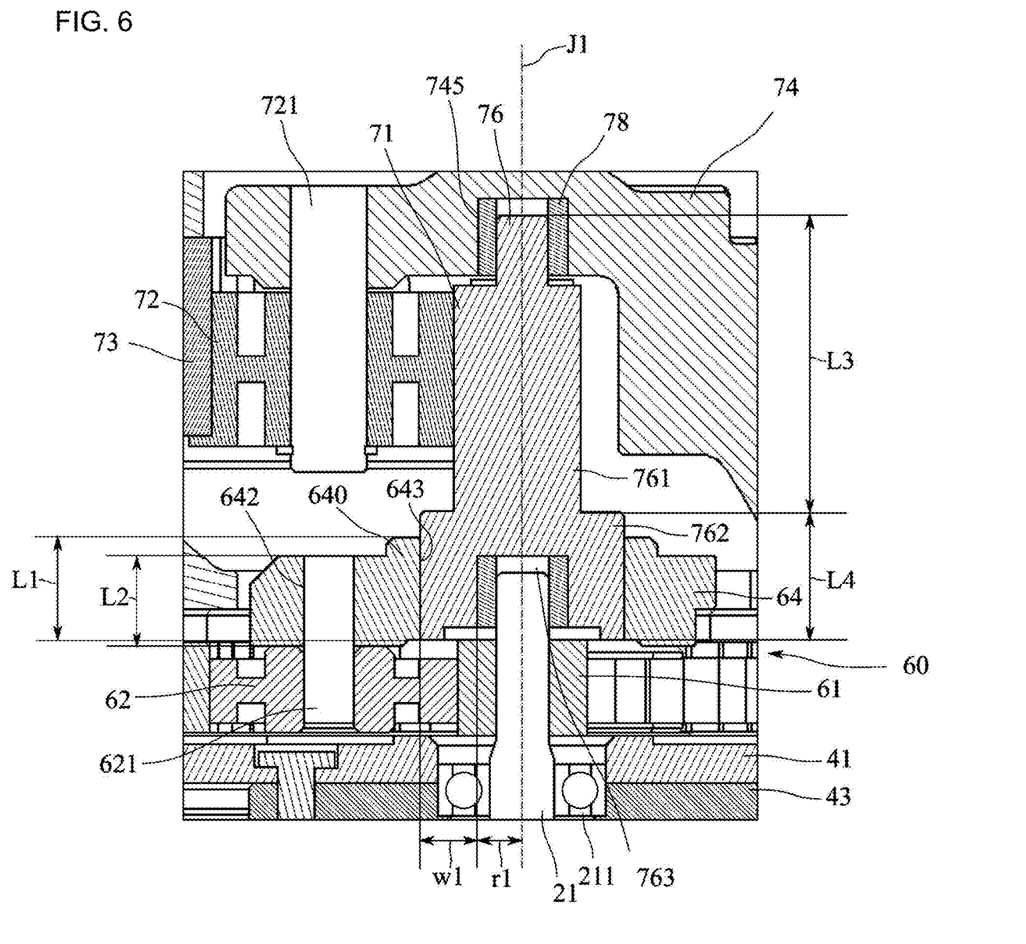
FIG. 6 is an enlarged cross-sectional view of the lower planetary gear mechanism.

FIG. 4 is a cross-sectional view of the lower planetary gear mechanism 60 taken along a plane orthogonal to the central axis J1. FIG. 5 is a cross-sectional view of the upper planetary gear mechanism 70 taken along a plane orthogonal to the central axis J1. FIG. 6 is an enlarged cross-sectional view of the lower planetary gear mechanism 60. As illustrated in FIGS. 2 and 3, the lower planetary gear mechanism 60 includes a lower sun gear 61, a lower planetary gear 62, a lower internal gear 63, a lower carrier 64, and a lower case 65.

As illustrated in FIGS. 2 and 3, the lower sun gear 61 is disposed at the upper end of the motor shaft 21. The lower sun gear 61 is disposed on the radial outer surface of the motor shaft 21. The lower sun gear 61 rotates integrally with the motor shaft 21. Therefore, the lower sun gear 61 may be formed of a single member with the motor shaft 21, or may be attached to the motor shaft 21 and fixed by a fixing method such as adhesion, welding, screwing, caulking, or press-fitting. In addition to those fixing methods, a fixing method capable of integrally rotatably fixing the lower sun gear 61 with the motor shaft 21 can be widely adopted.

The lower sun gear 61 is fixed to the motor shaft 21. Therefore, in the lower planetary gear mechanism 60, the motor shaft 21 is a shaft to which the lower sun gear 61 is attached.

As illustrated in FIG. 4, the lower planetary gear mechanism 60 includes three lower planetary gears 62. The three lower planetary gears 62 are arranged side by side at equal intervals in the circumferential direction. Note that the circumferential array of the lower planetary gears 62 is not limited to an equal interval. The lower planetary gear 62 meshes with the lower sun gear 61. The lower planetary gear mechanism 60 of the present embodiment includes the three lower planetary gears 62, but not limited to three. The lower planetary gear mechanism 60 is only required to include two or more lower planetary gears 62. However, in order to perform stable operation, the number of the lower planetary gears 62 is preferably 3 or more.

The lower planetary gear 62 is rotatably supported by a lower planetary shaft 621. An upper end part of the lower planetary shaft 621 is inserted into a planetary through hole 642 provided in the lower carrier 64. While the lower planetary gear 62 is rotatably supported by the lower planetary shaft 621, and the lower planetary shaft 621 is fixed to the lower carrier 64, the present invention is not limited to this configuration. For example, the lower planetary gear 62 may be fixed to the lower planetary shaft 621, and the lower planetary shaft 621 may be rotatably supported by the planetary through hole 642 of the lower carrier 64. That is, in the planetary gear mechanisms 60 and 70 arranged vertically, the lower planetary gear mechanism 60 includes the carrier 64 supporting the planetary gear 62.

As illustrated in FIG. 4, the lower internal gear 63 is an annular gear. The lower internal gear 63 has internal teeth formed on the radial inner surface. The lower internal gear 63 meshes with the lower planetary gear 62. The lower internal gear 63 is fixed to the lower case 65. As described later, the lower case 65 is fixed to the base part 40. The lower internal gear 63 fixed to the lower case 65 is fixed. For this reason, the lower planetary gear mechanism 60 is a so-called planetary type planetary gear mechanism in which the carrier is output. Note that details of the lower case 65 will be described later.

The lower carrier 64 is disposed in an upper part of the lower planetary gear mechanism 60. The lower carrier 64 has a central tube 640, a supporting blade 641, the planetary through hole 642, and a carrier through hole 643.

The central tube 640 extends along the central axis J1. Here, the central tube 640 is cylindrical. However, the shape is not limited to the cylindrical shape. The central tube 640 includes the carrier through hole 643 at the radial center. The carrier through hole 643 is a cylindrical through hole extending along the central axis J1. That is, the radial center of the lower carrier 64 is provided with the carrier through hole 643 penetrating in a direction along the central axis J1. An upper shaft 76 described later of the upper planetary gear mechanism 70 disposed above the lower planetary gear mechanism 60 is fixed to the carrier through hole 643.

The upper shaft 76 is fixed by being press-fitted into the carrier through hole 643. However, the fixing method is not limited to press-fitting, and a fixing method such as screwing, adhesion, or welding may be adopted. It is possible to widely adopt a fixing method capable of firmly fixing the upper shaft 76 to the lower carrier 64.

The supporting blade 641 extends radially outward from the radial outer surface of the central tube 640. The lower carrier 64 has three supporting blades 641. Each supporting blade 641 is provided with the planetary through hole 642. The planetary through hole 642 penetrates the supporting blade 641 in a direction along the central axis J1. As described above, the lower planetary shaft 621 is fixed to the planetary through hole 642. Note that the lower planetary shaft 621 is only required to be fixed to the planetary through hole 642, and may have a shape in which the planetary through hole 642 does not penetrate.

The lower case 65 includes an annular part 651, a lower tube 652, and an upper tube 653. The annular part 651 intersects with the central axis J1. The annular part 651 has an annular through hole 654 at the center. The annular through hole 654 is provided with the lower carrier 64. More specifically, the lower carrier 64 is disposed through the annular through hole 654.

The lower tube 652 has a cylindrical shape extending downward from the radial outer edge of the annular part 651. The lower tube 652 is fixed to the base plate 41 of the base part 40. The upper tube 653 protrudes upward along the central axis J1 from the upper surface of the annular part. The radial outer surface of the upper tube 653 is cylindrical. An inner ring of an output bearing Br described later is fixed to the radial outer surface of the upper tube 653. An output section 75 described later provided in the upper planetary gear mechanism 70 is fixed to the outer ring of the output bearing Br. That is, the output section 75 is rotatably attached to the upper tube 653 via the output bearing Br.

As illustrated in FIGS. 2 and 3, the upper planetary gear mechanism 70 includes an upper sun gear 71, an upper planetary gear 72, an upper internal gear 73, an upper carrier 74, the output section 75, and the upper shaft 76. The speed reduction mechanism 30 has a two-stage planetary gear mechanism. Therefore, the upper planetary gear mechanism 70 is the uppermost planetary gear mechanism.

As illustrated in FIGS. 2 and 3, the upper sun gear 71 is disposed in an upper part of the upper shaft 76. The upper sun gear 71 rotates integrally with the upper shaft 76. The upper sun gear 71 is a sun gear disposed at the uppermost part. The upper sun gear 71 may be formed of a single member with the upper shaft 76, or may be attached to the upper shaft 76 and fixed by a fixing method such as adhesion, welding, screwing, caulking, or press-fitting. In addition to those fixing methods, a fixing method capable of integrally rotatably fixing the upper sun gear 71 with the upper shaft 76 can be widely adopted.

The upper shaft 76 includes an upper column 761, a lower column 762, and a recess 763. The upper column 761 is columnar about the central axis J1. In the at least one planetary gear mechanism 70, the upper shaft 76 includes the upper column 761 having the upper sun gear 71.

The lower column 762 is connected to a lower end part of the upper column 761. The upper column 761 and the lower column 762 are integrally molded. As illustrated in FIG. 3 and the like, the outer diameter of the lower column 762 is larger than the outer diameter of the upper column 761. The upper column 761 is provided with the upper sun gear 71.

That is, in the at least one planetary gear mechanism 70, the upper shaft 76 includes the upper column 761 having the upper sun gear 71 and the lower column 762 extending axially downward from the axial lower end of the upper column 761. The lower column 762 is larger in outer diameter than the upper column 761.

This configuration makes it possible to reduce the effective diameter of the upper sun gear 71 while maintaining the rigidity of the upper shaft 76, and makes it possible to reduce the number of teeth of the upper sun gear 71. As a result, when the gear ratio is maintained in the upper planetary gear mechanism 70, it is possible to use the upper planetary gear 72 having a small effective diameter. This makes it possible to downsize the speed reduction mechanism 30. It is also possible to increase the effective diameter of the upper planetary gear 72. This makes it possible to increase the gear ratio without changing the size of the speed reduction mechanism 30.

The carrier through hole 643 of the carrier 64 of the lower planetary gear mechanism 60 is provided with the lower column 762 of the shaft 76 of the upper planetary gear mechanism 70. The radial outer surface of the lower column 762 comes into contact with the radial inner surface of the carrier through hole 643.

Due to this, as the lower carrier 64 rotates, the upper shaft 76 rotates.

As illustrated in FIG. 6, the axial length of a contact surface between the radial inner surface of the carrier through hole 643 and the radial outer surface of the lower column 762 is defined as a length L1. The axial length of a contact surface supporting the lower planetary gear 62 of the lower carrier 64 is defined as a length L2. The length L1 and the length L2 has a relationship of L1>L2. That is, the axial length L1 of the contact surface between the radial inner surface of the carrier through hole 643 and the radial outer surface of the lower column 762 is longer than the axial length L2 of the contact surface supporting the lower planetary gear 62 of the lower carrier 64.

This configuration makes it possible to increase a contact area between the lower carrier 64 and the shaft 76 to which the upper sun gear 71 is attached. This can transmit a larger torque.

The recess 763 is formed on the lower end surface of the upper shaft 76. The recess 763 is recessed axially upward from the lower end surface of the upper shaft 76. That is, in the planetary gear mechanisms 60 and 70 vertically adjacent to each other, the shaft 76 having the sun gear 71 of the upper planetary gear mechanism 70 includes the recess 763 recessed axially on the lower end surface.

The recess 763 is provided with the upper end of the shaft having the sun gear of the lower planetary gear mechanism, that is, the motor shaft 21 via a bearing member 77. That is, in the planetary gear mechanisms 60 and 70 vertically adjacent to each other, the upper end of the motor shaft 21 having the sun gear 61 of the lower planetary gear mechanism 60 is disposed in the recess 763 via the bearing member 77. The bearing member 77 is a sliding bearing, but is not limited to this. It is possible to adopt, for example, a fluid dynamic bearing, a ball bearing, or the like. Without using the bearing member 77, friction may be suppressed only with a lubricant.

As illustrated in FIG. 6, the radial length from the radial outer surface of the lower column 762 to the radial inner surface of the recess 763 is defined as a length w1. The radius of the radial inner surface of the recess 763 is defined as a radius r1. At this time, the length w1 and the radius r1 has a relationship of w1>r1. That is, the radial length w1 from the radial outer surface of the lower column 762 to the radial inner surface of the recess 763 is larger than the radius r1 of the radial inner surface of the recess 763.

Such a configuration makes it possible to enhance rigidity of the lower column 762. This makes it possible to further enhance the effect of suppressing misalignment of the upper shaft 76, and makes it possible to stabilize rotation of the upper sun gear 71.

The length w1 and the radius r1 may satisfy w1<r1. That is, the radial length w1 from the radial outer surface of the lower column 762 to the radial inner surface of the recess 763 may be smaller than the radius r1 of the radial inner surface of the recess 763.

Such a configuration makes it possible to bring the position of the radial outer end of the lower column 762 close to the central axis, and therefore it is possible to increase the lower carrier 64. This makes it possible to increase the diameter of the planetary shaft 621 supporting the lower planetary gear 62. This makes it possible to suppress inclination of the lower planetary gear 62.

Furthermore, as illustrated in FIG. 6, the axial length of the upper column 761 is defined as a length L3, and the axial length of the lower column 762 is defined as a length L4. In this case, the length L3 and the length L4 satisfy L3>L4. That is, in the planetary gear mechanisms 60 and 70 arranged vertically, the axial length L4 of the lower column 762 is shorter than the length L1 of the upper column 761.

This configuration makes it possible to reduce swinging even when the center of the upper shaft 76 swings with respect to the central axis J1 due to a gap between the upper end of the upper shaft 76 and a final recess 745. This makes it possible to enhance the rotation accuracy of the upper shaft 76, and makes it possible to transmit torque more smoothly.

As illustrated in FIG. 5, the upper planetary gear mechanism 70 includes three upper planetary gears 72. The three upper planetary gears 72 are arranged side by side at equal intervals in the circumferential direction. Note that the circumferential array of the upper planetary gears 72 is not limited to an equal interval. The upper planetary gear 72 meshes with the upper sun gear 71. The upper planetary gear mechanism 70 of the present embodiment includes the three upper planetary gears 72, but not limited to three. The upper planetary gear mechanism 70 is only required to include two or more upper planetary gears 72. However, in order to perform stable operation, the number of the upper planetary gears 72 is preferably 3 or more.

The upper planetary gear 72 is rotatably supported by an upper planetary shaft 721. An upper end part of the upper planetary shaft 721 is inserted into a planetary through hole 743 provided in the upper carrier 74. While the upper planetary gear 72 is rotatably supported by the upper planetary shaft 721, and the upper planetary shaft 721 is fixed to the upper carrier 74, the present invention is not limited to this configuration. For example, the upper planetary gear 72 may be fixed to the upper planetary shaft 721, and the upper planetary shaft 721 may be rotatably supported by the planetary through hole 743 of the upper carrier 74.

The upper carrier 74 is disposed in an upper part of the upper planetary gear mechanism 70. The upper carrier 74 includes a support 741, three legs 742, a carrier shaft 744, and the final recess 745.

The upper carrier 74 is a final carrier 74. That is, the uppermost planetary gear mechanism 70 of the speed reduction mechanism 30 includes the final carrier 74 that is disposed on an axially upper part and has the center overlapping with the central axis J1.

The support 741 has a disk shape expanding in a direction orthogonal to the central axis J1. The three legs 742 are connected to a radial outer edge of the support 741. The three legs 742 extend axially downward. The three legs 742 are arranged at equal intervals in the circumferential direction. The three legs 742 are fixed to the lower case 65. Screwing is adopted as the fixing method, but the fixing method is not limited to this. For example, a fixing method such as welding or adhesion may be adopted. It is possible to widely adopt a fixing method capable of firmly fixing the leg 742 to the lower case 65. That is, the upper planetary gear mechanism 70 is a so-called star type planetary gear mechanism in which the carrier 74 is fixed.

The carrier shaft 744 extends axially upward from a central part of the upper surface of the support 741. The carrier shaft 744 is columnar about the central axis J1. An inner ring of the output bearing Br that rotatably supports the output section 75 is fixed to the radial outer surface of the carrier shaft 744. That is, the output section 75 is rotatably attached to the carrier shaft 744 via the output bearing Br.

The final recess 745 is recessed axially upward from the lower end surface of the support 741 of the upper carrier 74. That is, the final carrier 74 includes the final recess 745 recessed axially on the lower end surface. The final recess 745 is provided with an upper end part of the upper shaft 76 via a final bearing member 78. That is, the upper end of the shaft 76 having the sun gear 71 disposed at the uppermost part is disposed in the final recess 745 via the final bearing member 78.

More specifically, the upper end part of the upper shaft 76 is rotatably supported by the upper carrier 74 via the final bearing member 78. The final bearing member 78 is a sliding bearing, but is not limited to this. It is possible to adopt, for example, a fluid dynamic bearing, a ball bearing, or the like. Without using the final bearing member 78, friction may be suppressed only with a lubricant.

As illustrated in FIG. 5, the upper internal gear 73 is an annular gear. The upper internal gear 73 has internal teeth formed on the radial inner surface. The upper internal gear 73 meshes with the upper planetary gear 72. The upper internal gear 73 is fixed to the radial inner surface of the output section 75.

The output section 75 has a covered tubular shape. The output section 75 includes a lid 751 and a tube 752. The lid 751 has a disk shape expanding in a direction orthogonal to the central axis J1. The lid 751 has a through hole 753 penetrating along the central axis J1 at the center. The carrier shaft 744 of the upper carrier 74 penetrates the through hole 753. The outer ring of the output bearing Br is fixed to the through hole 753. That is, the output section 75 is rotatably supported by the carrier shaft 744 of the upper carrier 74 via the output bearing Br.

As mentioned earlier, the motor section 20 of the output device 10 is supplied with current from the power supply not illustrated. Specifically, the coil 27 of the motor section 20 is supplied with current. Due to this, the coil 27 is excited, and the rotor 22 and the motor shaft 21 fixed to the rotor 22 rotate about the central axis J1.

As the motor shaft 21 rotates, the lower sun gear 61 disposed on the motor shaft 21 also rotates. Torque of the motor shaft 21 is transmitted from the lower sun gear 61 to the lower planetary gear 62. Due to this, the lower planetary gear 62 is supported by the lower planetary shaft 621 and rotates. The lower planetary gear 62 meshes also with the lower internal gear 63. The lower internal gear 63 is fixed to the lower case 65. Therefore, as the lower planetary gear 62 rotates, the lower carrier 64 rotates about the central axis J1.

The upper shaft 76 is fixed to the lower carrier 64. Therefore, as the lower carrier 64 rotates, the upper shaft 76 rotates. The reduction ratio of the upper shaft 76 with respect to the motor shaft 21 is determined by the tooth number ratio of the lower sun gear 61 and the lower internal gear 63.

The upper sun gear 71 is fixed to the upper shaft 76. The upper sun gear 71 meshes with the upper planetary gear 72. Therefore, torque is transmitted from the upper sun gear 71 to the upper planetary gear 72. Due to this, the upper planetary gear 72 rotates. The upper planetary gear 72 meshes also with the upper internal gear 73. Since the upper carrier 74 is fixed, as the upper planetary gear 72 rotates, the upper internal gear 73 rotates. Due to this, the output section 75 to which the upper internal gear 73 is fixed rotates. In the upper planetary gear mechanism 70, the reduction ratio of the output section 75 with respect to the upper shaft 76 is determined by the tooth number ratio of the upper sun gear 71 and the upper internal gear 73.

The recess 763 formed in the upper shaft 76 is provided with the upper end of the motor shaft 21 via the bearing member 77. Due to this, a lower end part of the upper shaft 76 is supported by the motor shaft 21 supported by the shaft bearing 211. This makes it possible to suppress core misalignment of the upper shaft 76 to which the sun gear 71 of the upper planetary gear mechanism 70 is attached. Since a part of the motor shaft 21 having the lower sun gear 61 is inserted into the recess 763 of the upper shaft 76, the axial length of the output device 10 can be shortened. That is, it is possible to downsize the output device 10.

Since the upper end part of the shaft 76 of the planetary gear mechanism 70 disposed at the uppermost part is rotatably supported by the output section 75, the upper and lower end parts of the shaft 76 to which the upper sun gear 71 is attached are rotatably supported in the upper planetary gear mechanism 70. This makes it possible to suppress misalignment of the upper shaft 76 to which the upper sun gear 71 is attached.

The lower end and the upper end of the upper shaft 76 are respectively supported by the motor shaft 21 and the upper carrier 74 in which positional misalignment with respect to the central axis J1 is suppressed. Therefore, when the upper shaft 76 rotates, the center of the upper shaft 76 is less likely to misalign. Therefore, since the gears accurately mesh with each other, smooth rotation can be output from the output section 75 of the output device 10.

In the output device 10 according to the present embodiment, the two planetary gear mechanisms 60 and 70 are arranged axially to form multiple stages. This makes it possible to obtain a large reduction ratio without increasing the outer diameter of the output device 10.

The present disclosure can be used as a power source of a device that performs work by electric power such as an electric jack.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. An output device comprising:
    a motor section including a motor shaft extending along a central axis extending vertically; and
    a speed reduction mechanism disposed on an upper part of the motor section and connected to the motor shaft, wherein
    the speed reduction mechanism includes a plurality of planetary gear mechanisms arranged side by side vertically along the central axis,
    the plurality of planetary gear mechanisms includes an upper planetary gear mechanism and a lower planetary gear mechanism,
    in the plurality of planetary gear mechanisms vertically adjacent to each other,
        an upper shaft having an upper sun gear of the upper planetary gear mechanism includes a recess recessed axially on a lower end surface of the upper shaft, and
        an upper end of the motor shaft having a lower sun gear of the lower planetary gear mechanism is disposed in the recess via a bearing member, and
    the upper end of the motor shaft is located at a midpoint of the upper shaft vertically along the central axis.

2. The output device according to claim 1, wherein
    the upper planetary gear mechanism is at an uppermost part of the speed reduction mechanism and includes
        a final carrier that is disposed on an axially upper part of the upper planetary gear mechanism and has a center overlapping with the central axis,
    the final carrier includes a final recess recessed axially on a lower end surface of the final carrier, and
    an upper end of the upper shaft having the upper sun gear is disposed in the final recess via a final bearing member.

3. The output device according to claim 1, wherein
    the upper shaft includes
        an upper column having the upper sun gear, and
        a lower column extending axially downward from an axial lower end of the upper column, and the lower column is larger in outer diameter than the upper column.

4. The output device according to claim 3, wherein
    in the plurality of planetary gear mechanisms arranged vertically,
        the lower planetary gear mechanism includes a carrier supporting a planetary gear, a radial center of the carrier on a lower side is provided with a carrier through hole which penetrates in a direction along the central axis and in which the lower column of the upper planetary gear mechanism is disposed, a radial outer surface of the lower column comes into contact with a radial inner surface of the carrier through hole, and an axial length of a contact surface between the radial inner surface of the carrier through hole and the radial outer surface of the lower column is longer than an axial length of a contact surface that supports the planetary gear of the carrier.

5. The output device according to claim 3, wherein a radial length from a radial outer surface of the lower column to a radial inner surface of the recess is larger than a radius of the radial inner surface of the recess.

6. The output device according to claim 3, wherein a radial length from a radial outer surface of the lower column to a radial inner surface of the recess is smaller than a radius of the radial inner surface of the recess.

7. The output device according to claim 4, wherein an axial length of the lower column is shorter than a length of the upper column.

8. The output device according to claim 1, wherein the motor shaft includes
   an upper column having the lower sun gear, and
   a lower column extending axially downward from an axial lower end of the upper column, and the lower column is larger in outer diameter than the upper column.

9. An output device, comprising:
a motor section including a motor shaft extending along a central axis extending vertically; and
a speed reduction mechanism disposed on an upper part of the motor section and connected to the motor shaft, wherein
the speed reduction mechanism includes a plurality of planetary gear mechanisms arranged side by side vertically along the central axis,
the plurality of planetary gear mechanisms includes an upper planetary gear mechanism and a lower planetary gear mechanism,
in the plurality of planetary gear mechanisms vertically adjacent to each other,
   an upper shaft having an upper sun gear of the upper planetary gear mechanism includes a recess recessed axially on a lower end surface of the upper shaft, and
   an upper end of the motor shaft having a lower sun gear of the lower planetary gear mechanism is disposed in the recess via a bearing member,
the upper shaft includes
   an upper column having the upper sun gear, and
   a lower column extending axially downward from an axial lower end of the upper column, and the lower column is larger in outer diameter than the upper column, the lower planetary gear mechanism includes a carrier supporting a planetary gear, a radial center of the carrier on a lower side is provided with a carrier through hole which penetrates in a direction along the central axis and in which the lower column of the upper planetary gear mechanism is disposed, a radial outer surface of the lower column comes into contact with a radial inner surface of the carrier through hole, and an axial length of a contact surface between the radial inner surface of the carrier through hole and the radial outer surface of the lower column is longer than an axial length of a contact surface that supports the planetary gear of the carrier.

10. An output device, comprising:
a motor section including a motor shaft extending along a central axis extending vertically; and
a speed reduction mechanism disposed on an upper part of the motor section and connected to the motor shaft, wherein
the speed reduction mechanism includes a plurality of planetary gear mechanisms arranged side by side vertically along the central axis,
the plurality of planetary gear mechanisms includes an upper planetary gear mechanism and a lower planetary gear mechanism,
in the plurality of planetary gear mechanisms vertically adjacent to each other,
   an upper shaft having an upper sun gear of the upper planetary gear mechanism includes a recess recessed axially on a lower end surface of the upper shaft, and
   an upper end of the motor shaft having a lower sun gear of the lower planetary gear mechanism is disposed in the recess via a bearing member,
the upper planetary gear mechanism is at an uppermost part of the speed reduction mechanism and includes
   a final carrier that is disposed on an axially upper part of the upper planetary gear mechanism and has a center overlapping with the central axis,
the final carrier includes a final recess recessed axially on a lower end surface of the final carrier,
an upper end of the upper shaft having the upper sun gear is disposed in the final recess via a final bearing member, and
the upper end of the upper shaft is located at a midpoint of the final carrier vertically along the central axis.

* * * * *